(12) United States Patent
Linn

(10) Patent No.: US 6,612,554 B1
(45) Date of Patent: Sep. 2, 2003

(54) HYDRAULIC ANTIVIBRATION DEVICE

(75) Inventor: Matthew Allen Linn, Celina, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/000,475

(22) Filed: Oct. 24, 2001

(51) Int. Cl.[7] ............................................. F16F 13/00
(52) U.S. Cl. ................................. 267/140.13; 267/219
(58) Field of Search ..................... 267/140.11, 140.3, 267/140.4, 140.13, 219

(56) References Cited

U.S. PATENT DOCUMENTS

| | | | |
|---|---|---|---|
| 4,653,734 A | 3/1987 | Jördens ..................... | 267/8 R |
| 4,657,219 A | 4/1987 | Kakimoto ................... | 248/562 |
| 4,657,227 A | 4/1987 | Hofmann ..................... | 267/8 R |
| 4,657,232 A | 4/1987 | West ....................... | 267/140.1 |
| 4,671,227 A | 6/1987 | Hollerweger et al. ....... | 123/192 |
| 4,709,907 A | 12/1987 | Thorn ...................... | 267/140.1 |
| 4,720,086 A | 1/1988 | Le Salver et al. ........ | 267/140.1 |
| 4,726,573 A | 2/1988 | Hamaekers et al. ..... | 267/140.1 |
| 4,739,962 A * | 4/1988 | Morita et al. .......... | 267/140.13 |
| 4,811,934 A | 3/1989 | Bebermeier et al. ..... | 267/140.1 |
| 4,815,720 A * | 3/1989 | Vanessi ..................... | 188/320 |
| 4,836,513 A | 6/1989 | Kramer et al. ........... | 267/140.1 |
| 4,925,162 A | 5/1990 | Kojima .................... | 267/140.1 |
| 4,938,463 A | 7/1990 | Miyamoto ................. | 267/140.1 |
| 5,240,233 A * | 8/1993 | Kato et al. ............. | 267/140.13 |
| 5,386,973 A * | 2/1995 | Brenner et al. ........ | 267/140.13 |
| 5,630,573 A | 5/1997 | Suzuki et al. .......... | 267/140.13 |
| 5,786,022 A * | 7/1998 | Agarwal et al. ......... | 106/144.1 |
| 6,032,935 A * | 3/2000 | Mizutani et al. ....... | 267/140.11 |
| 6,276,672 B1 * | 8/2001 | Rudolf et al. .......... | 267/140.13 |
| 6,357,731 B1 * | 3/2002 | Tanahashi .............. | 267/140.13 |
| 6,378,852 B1 * | 4/2002 | Ticks et al. ............ | 267/140.14 |
| 6,435,487 B1 * | 8/2002 | Takaoka et al. ....... | 267/140.11 |

* cited by examiner

*Primary Examiner*—Jack Lavinder
*Assistant Examiner*—Benjamin A Pezzlo
(74) *Attorney, Agent, or Firm*—Richard B O'Planick; Nancy T Krawczyk

(57) ABSTRACT

Disclosed is a hydraulic antivibration mount. The mount has an annular rubber spring et in an outer metal casing, encasing an inner metal portion having a central mounting means. The outer metal casing is crimped over the flange of an end cap. Located with the end cap and retained within the crimped portion is a flexible diaphragm. Also retained within the crimped portion is a damper plate dividing the interior of the mount into an upper chamber A and a lower chamber B to be filled with fluid. The damper plate is formed from an upper plate and a lower plate. The upper and lower plates form a flow channel between the two plates which extends at least partially around the circumference of the damper plate, the flow channel permitting communication between the upper and lower chamber. The upper plate has an opening communicating to the upper chamber with an integral tab extending from the opening into the flow channel to block the channel.

3 Claims, 3 Drawing Sheets

HYDRAULIC ANTIVIBRATION DEVICE

FIELD OF THE INVENTION

The present invention is directed to an hydraulic antivibration device. More specifically, the present invention is directed to an improved flow channel deflector for a hydraulic engine mount.

BACK GROUND OF THE INVENTION

A typical engine mount contains two sealed chambers separated by an intermediate partition having a damping channel passing there through and providing communication between the chambers. The engine mount normally has one end member attached to an engine block and another end member attached to a vehicle frame, with the end members being resiliently connected to each other by an elastomeric member which permits one end member to move in response to vibrations with respect to the other. In order to damp vibrations between the two end members, hydraulic fluid is pumped back and forth from one chamber to the other through the damping channel in the partition.

The damping channel may be formed in a variety of methods. The most conventional method is with the use of a pair of thick metal plates. Within each metal plate, a partial arcuate groove is formed around the circumference of each plate and then the plates are matched so that the grooves are aligned, forming a channel. The channel opening and exit are offset from each other so that the fluid must flow at least partially through the channel to get from one chamber to the other.

These conventional plates are formed by casting, press forming or machining thick metal into which the grooves are machined.

SUMMARY OF THE INVENTION

The present invention is directed to a simplified construction of the damper plate resulting in a lighter weight damper plate and easier construction of the mount.

The present invention is a hydraulically damped antivibration mount. The mount has a rubber spring, an outer metal casing, an end cap, and a damper plate. The spring is encased within the outer metal casing, the outer metal casing being crimped to the end cap, and the damper plate dividing the interior of the mount into an upper and a lower chamber. The damper plate is formed from an upper plate and a lower plate. The upper and lower plates form a flow channel between the two plates which extends at least partially around the circumference of the damper plate, the flow channel permitting communication between the upper and lower chamber. The upper plate has an opening communicating to the upper chamber with an integral tab extending from the opening into the flow channel to block the channel.

In one aspect of the invention, the upper plate is a flat metal plate to form the top of the flow channel. The lower plate has a trough extending about the circumference of the plate to form the base of the flow channel.

The tab formed in the top plate may be generally L-shaped, extending both into the flow channel and along the flow channel. The tab may be fixedly secured to the base of the flow channel.

BRIEF DESCRIPTION OF THE DRAWINGS

The invention will be described by way of example and with reference to the accompanying drawings in which.

DETAILED DESCRIPTION OF THE INVENTION

Figure 1:
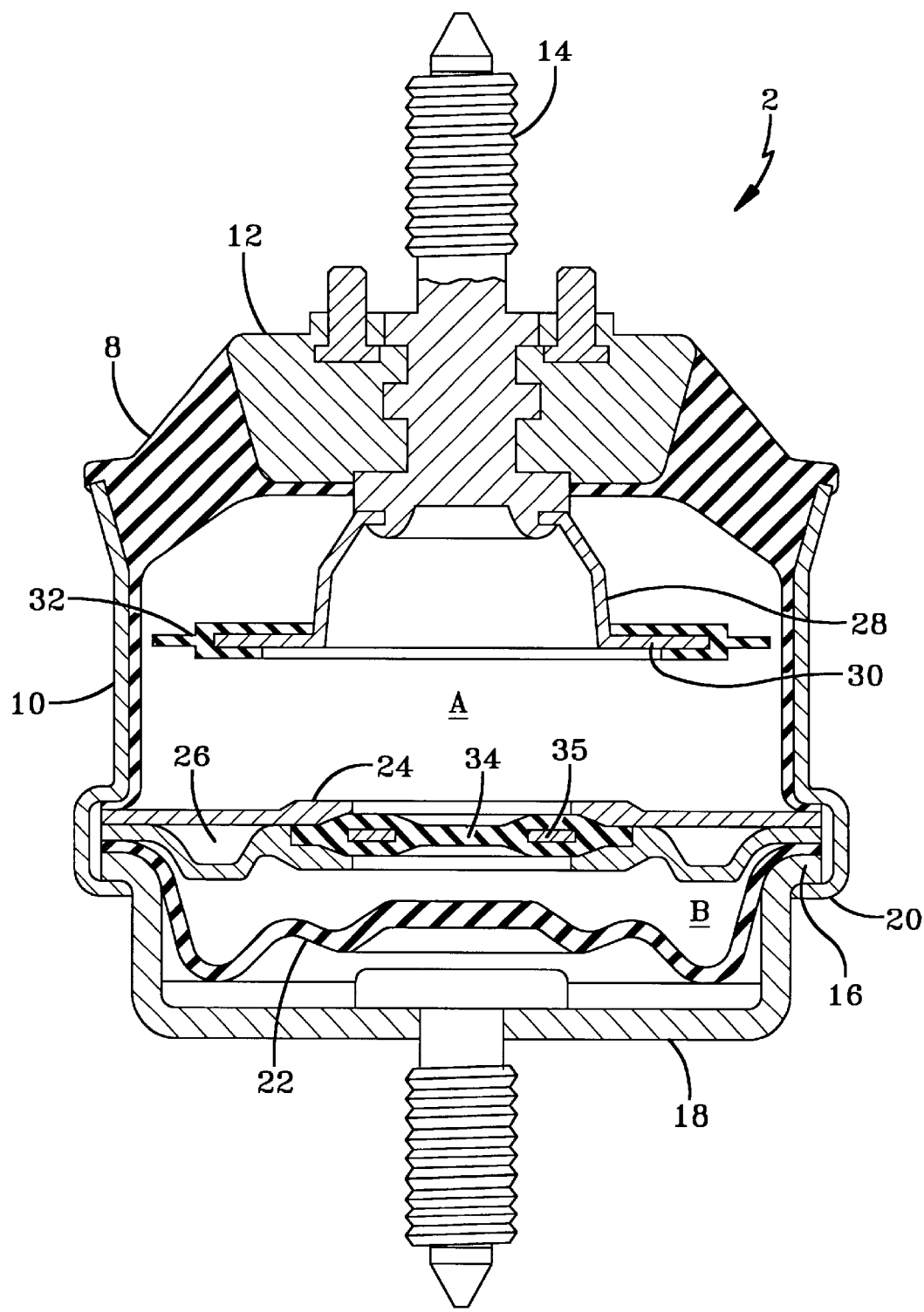
FIG. 1 is a cross-sectional view of a hydraulic mount.

A hydraulic antivibration mount is illustrated in FIG. 1. It is to be understood that the terms "upper" and "lower" are used only for the clarity of the description since the described mount may be used in a reverse orientation.

The mount 2 has an annular rubber spring 8 set in an outer metal casing 10, encasing an inner metal portion 12 having a central mounting means 14. The outer metal casing 10 is crimped over the flange 16 of an end cap 18. Located with the end cap 18 and retained within the crimped portion 20 is a flexible diaphragm 22. Also retained within the crimped portion 20 is a damper plate 24 dividing the interior of the mount 2 into an upper chamber A and a lower chamber B to be filled with fluid.

Within the upper chamber A is a cup shaped bumper 28 attached to the inner metal portion 12 and extending axially inward into the upper chamber A. The bumper 28 has a radially outwardly extending flange 30 with a flexible flab 32 extending radially outwardly from the flange 30 toward the inner cavity wall 32.

Figure 2:
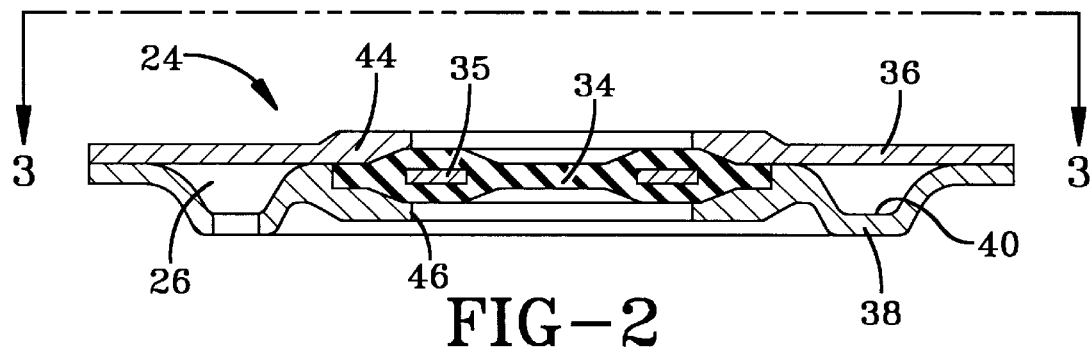
FIG. 2 is a cross-sectional view of the mount damper plate.

The upper chamber A and the lower chamber B communicate through a damper channel 26. The damper plate 24 has a disc-type decoupler 34, see also FIG. 2. The decoupler 34 may be provided with reinforcing 35 to vary the response characteristics of the decoupler 34. The edges of the decoupler 34 are crimped by the internal circumferential edge of the thin metal plates 36, 38. Both the top and bottom plates 36, 38 are circular shaped with central openings.

Figure 3:
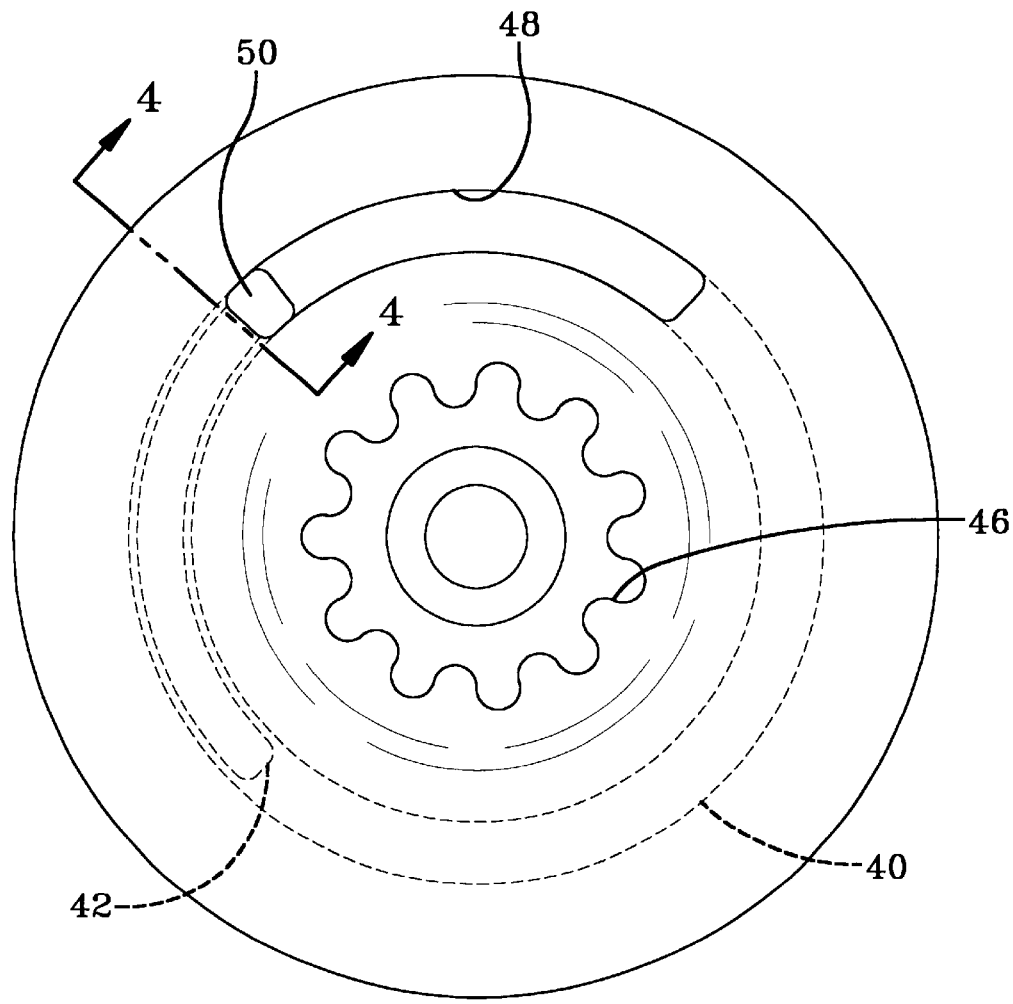
FIG. 3 is an overhead view of the damper plate.

The bottom plate 38 has a trough 40 that extends around the circumference of the plate. The exact configuration, or cross-sectional area, of the trough 40, is selected, in connection with the viscosity of the damping fluid, to achieve a desired damping effect for the intended application of the mount 2. At one end of the trough 40 is an opening 42 for the fluid to flow out of the channel and into chamber B, see FIG. 3. The opening 42 extends along an arcuate portion of the trough 40. The plate 38 has a raised internal portion at the inner edge for gripping the decoupler 34.

Figure 4:
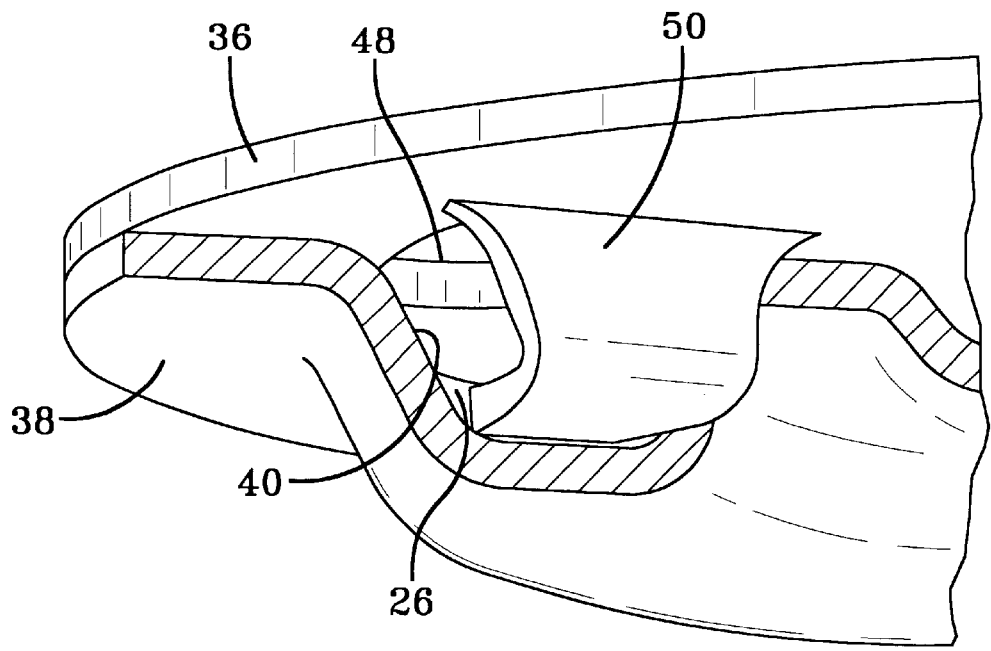
FIG. 4 is a perspective view of the upper and bottom plates of the damper plate.

The top plate 36 also has a raised internal portion 44 at the inner edge 46 for gripping the decoupler 34; however, the remained of the plate 36 is generally flat, covering the trough 40 to complete the formation of the channel 26. Located along an arcuate portion of the circumference of the plate 36 is an opening 48 to the flow channel 26. Located at one end of the opening 48, closest to the opening 42 of the bottom plate 38 when the damper plate 24 is assembled, is a tab 50, illustrated in FIG. 4, that diverts the flow of fluid into the channel 26. The tab 50 extends from the surface of the plate 36 into the channel 26. The tab 50 is formed by material removed to form the opening 48 ro is separately welded to the plate 36. The edges of the tab 50 correspond in configuration to the cross-sectional shape of the channel 26. Preferably, the base of the tab 50 is fixedly secured to the base of the channel to prevent the tab 50 from movement due to fluid pressure.

Since the trough 40, and thus the channel 26, extends fully about the circumference of the damper plate 24, the tab 50 acts to divert the fluid flow into and around the channel 26. The fluid must flow into the channel opening 48 and out of the channel exit 42. The arcuate length of the opening 48 and the exit 42 are selected to achieve a desired damping characteristic. While the exit 42 is shown to be directly adjacent to the tab 50, the arcuate channel length may be effectively reduced by distancing the exit 42 from the tab 50. Such a placement may create some backflow in the channel 26, and this should be taken into consideration when determining the damping effects of the mount 2.

The edges 46 forming the central openings are illustrated as scalloped edges 46. The central opening edges 46 are crimped together to retain the decoupler 34. After crimping, the scalloped edges 46 of the plates 36, 38 may or may not be aligned; alternatively, the inner edges 46 may have a non-scalloped configuration.

Figure 5:
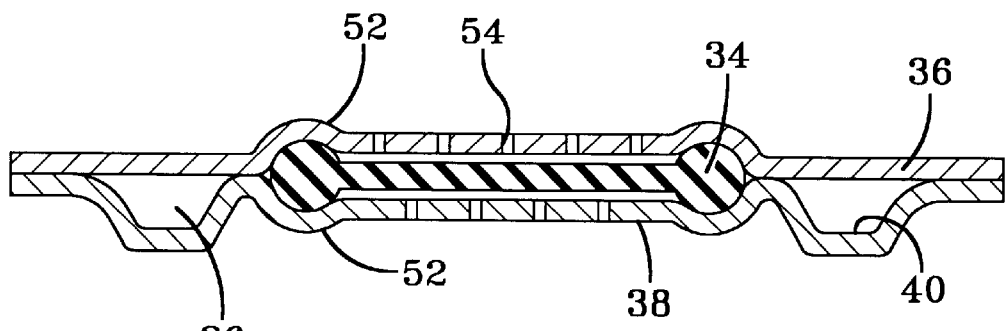
FIG. 5 is an alternative construction of the damper plate.

FIG. 5 shows an alternative construction of the damper plate 24. The damper plate is again formed of two plates 36, 38. The plates 36, 38 are disc-shaped with raised central portions 52 and a decoupler 34 retained within the central portions. To permit the fluid to contact the decoupler, the plates 36, 38 are provided with a series of orifices 54. The channel 26, and any variations in the channel formation, is as already described.

By forming the damper plate 24 out of the two plates, 36, 38 construction of the plates is simplified. Also, by using metal plates with a trough 40 formed in one plate, as opposed to the convention thick metal plates with grooves formed in each plate, the weight of the damper plate 24, and thus the mount 2, is reduced.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A hydraulically damped anti-vibration mount comprising a rubber spring, an outer metal casing, an end cap, and a damper plate,
   the spring being encased within the outer metal casing, the outer metal casing being crimped to the end cap, and the damper plate dividing the interior of the mount into an upper and a lower chamber,
   the damper plate being formed from an upper plate and a lower plate, the upper and lower plates forming a flow channel between the two plates which extends at least partially around the circumference of the damper plate, the flow channel communicating with both the upper and lower chamber,
   the upper plate having an opening communicating to the upper chamber, wherein an integral tab extends from the opening into the flow channel to block the channel,
   wherein the tab is L-shaped and extends both into the flow channel and along the flow channel.

2. A mount as set forth in claim 1 wherein the tab is fixedly secured to the base of the flow channel.

3. A hydraulically damped anti-vibration mount comprising a rubber spring, an outer metal casing, an end cap, and a damper plate,
   the spring being encased within the outer metal casing, the outer metal casing being crimped to the end cap, and the damper plate dividing the interior of the mount into an upper and a lower chamber,
   the damper plate being formed from an upper plate and a lower plate, the upper and lower plates forming a flow channel between the two plates which extends at least partially around the circumference of the damper plate, the flow channel communicating with both the upper and lower chamber, the upper plate having an opening communicating to the upper chamber, wherein an integral tab extends from the opening into the flow channel to block the channel,
   wherein the tab is substantially L-shaped comprising a base portion fixedly secured to the base of the flow channel and extending into the flow channel and a remote portion connecting with the base portion at an angle and extending along the flow channel.

\* \* \* \* \*